(12) United States Patent
Sahasrabudhe et al.

(10) Patent No.: US 8,548,648 B2
(45) Date of Patent: Oct. 1, 2013

(54) FLY-BY-WIRE FLIGHT CONTROL SYSTEM WITH ELECTRONIC LEAD/LAG DAMPER ALGORITHM

(75) Inventors: Vineet Sahasrabudhe, Hamden, CT (US); Philip J. Gold, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1702 days.

(21) Appl. No.: 11/772,355

(22) Filed: Jul. 2, 2007

(65) Prior Publication Data
US 2010/0023186 A1    Jan. 28, 2010

(51) Int. Cl.
*G06F 7/00* (2006.01)

(52) U.S. Cl.
USPC .................. 701/3; 701/11; 701/14

(58) Field of Classification Search
USPC ................................. 701/3, 11, 14
See application file for complete search history.

(56) References Cited

U.S. PATENT DOCUMENTS

| | | | |
|---|---|---|---|
| 3,759,632 A | 9/1973 | Rybicki | |
| 3,923,419 A | 12/1975 | Mouille | |
| 4,004,757 A | 1/1977 | Doman | |
| 4,073,600 A | 2/1978 | Doman | |
| 4,231,705 A | 11/1980 | Watson | |
| 4,297,078 A | 10/1981 | Martin | |
| 4,330,829 A * | 5/1982 | Fischer et al. | 701/12 |
| 4,371,939 A | 2/1983 | Adams et al. | |
| 4,392,203 A | 7/1983 | Fischer et al. | |
| 4,437,313 A | 3/1984 | Taber et al. | |
| 4,484,283 A | 11/1984 | Verzella et al. | |
| 4,519,743 A * | 5/1985 | Ham | 416/1 |
| 4,549,850 A | 10/1985 | Vincent | |
| 4,601,639 A | 7/1986 | Yen et al. | |
| 4,874,292 A | 10/1989 | Matuska et al. | |
| 4,886,419 A | 12/1989 | McCafferty | |
| 4,915,585 A | 4/1990 | Guimbal | |
| 4,958,786 A * | 9/1990 | Ogawa et al. | 244/17.13 |
| 4,980,835 A * | 12/1990 | Lawrence et al. | 701/4 |
| 5,092,738 A | 3/1992 | Byrnes et al. | |
| 5,242,130 A * | 9/1993 | Mouille et al. | 244/17.13 |
| 5,242,267 A | 9/1993 | Byrnes et al. | |
| 5,263,821 A | 11/1993 | Noehren et al. | |
| 5,372,478 A | 12/1994 | McCafferty | |
| 5,446,666 A * | 8/1995 | Bauer | 701/4 |
| 5,913,659 A | 6/1999 | Doolin et al. | |
| 6,004,099 A | 12/1999 | Bansemir et al. | |
| 6,695,583 B2 | 2/2004 | Schmaling et al. | |
| 6,886,777 B2 | 5/2005 | Rock | |
| 7,035,124 B2 | 4/2006 | Chadwick et al. | |
| 2007/0137956 A1 | 6/2007 | Stamps et al. | |
| 2008/0247876 A1* | 10/2008 | Stamps et al. | 416/140 |

OTHER PUBLICATIONS

International Search Report mailed Jul. 31, 2009.

(Continued)

*Primary Examiner* — James Trammell
*Assistant Examiner* — Jerrah Edwards
(74) *Attorney, Agent, or Firm* — Carlson, Gaskey & Olds P.C.

(57) ABSTRACT

An electronic lead/lag damper algorithm implemented as part of the fly-by-wire flight control system to minimize or eliminate mechanical lead/lag dampers of a rotary wing aircraft. The electronic lead/lag damper algorithm uses a cross-feed control methodology that band-pass filters pitch and roll rates and feeds back a signal to the lateral and longitudinal cyclic inputs to provide electronic stability to rotor lag modes.

18 Claims, 4 Drawing Sheets

(56) References Cited

OTHER PUBLICATIONS

Extended European Search Report dated Mar. 25, 2013 for European Application No. 08 829 369.1.
FK Straub, W. Warmbrodt: The Use of Active Controls to Augment Rotor/Fuselage Stability, Journal of the American Helicopter Society 13-22, 1985.
G. Reichert, U. Arnold: Active Rotor Control of Helicopter Ground and Air Resonance, 16th European Rotorcraft Forum, Glasgow, Scotland, Sep. 18-20, 1990.
CH. Kessler, G. Reichert: Active Control of Ground and Air Resonance Including Transition from Ground to Air. 20th European Rotorcraft Forum, Amsterdam, Netherlands, pp. 64.1-64.17, Oct. 4-7, 1994.
C. Kessler, G. Reichert: Active Control to Augment Rotor Lead Lag Damping, The Aeronatical Journal, May 1998 first presented at the 22nd European Rotorcraft Forum Sep. 1996.

* cited by examiner

FLY-BY-WIRE FLIGHT CONTROL SYSTEM WITH ELECTRONIC LEAD/LAG DAMPER ALGORITHM

BACKGROUND OF THE INVENTION

The present invention relates to a fly-by-wire flight control system, and more particularly to an electronic lag damper algorithm implemented as part of the fly-by-wire flight control system which augments a mechanical lead/lag damper for a rotor system of a rotary wing aircraft.

Rotary-wing aircraft include lead/lag dampers to increase rotor blade lead/lag mode damping characteristics. The damper assembly reacts against lead/lag motions of each rotor blade assembly of the rotor system to dampen vibration. Typically, the dampers are sized for a variety of considerations including the need to stabilize ground resonance of the rotary-wing aircraft.

Although effective, current dampers operate under high pressures and may require relatively comprehensive maintenance attention. Furthermore, as each rotor blade requires a lead/lag damper, the dampers increase the overall structural envelope and weight of the rotor system such that aircraft weight is concomitantly increased.

Accordingly, it is desirable to provide a flight control system which provides an electronic lead/lag damper algorithm to minimize or eliminate mechanical lead/lag dampers within a rotor system of a rotary wing aircraft to thereby decrease the overall structural envelope and weight of the rotor system.

SUMMARY OF THE INVENTION

The flight control system according to the present invention includes an electronic lag damper algorithm implemented as part of the fly-by-wire flight control system to minimize or eliminate mechanical lead/lag dampers for an articulated rotor system of a rotary wing aircraft.

The electronic lead/lag damper algorithm utilizes a cross-feed control methodology that band-pass filters pitch and roll rates then feeds back a signal to the lateral and longitudinal cyclic inputs to add electronic stability to rotor lag modes. The rotor lag modes typically interact with the landing gear frequency during startup/shutdown to produce a phenomenon called ground resonance which this invention reduces during on-ground and other interactive modes. The stabilization added by the electronic lag damper allows the mechanical dampers on the rotor system to be reduced in size, by providing equivalent (or more than equivalent) electronic lag damping.

The electronic lead/lag damper algorithm is implemented with a very high degree of reliability as part of a fly-by-wire control system.

The present invention therefore provides an electronic lead/lag damper algorithm to minimize or eliminate mechanical lead/lag dampers within a rotor system of a rotary wing aircraft to thereby decrease the overall structural envelope and weight of the rotor system.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
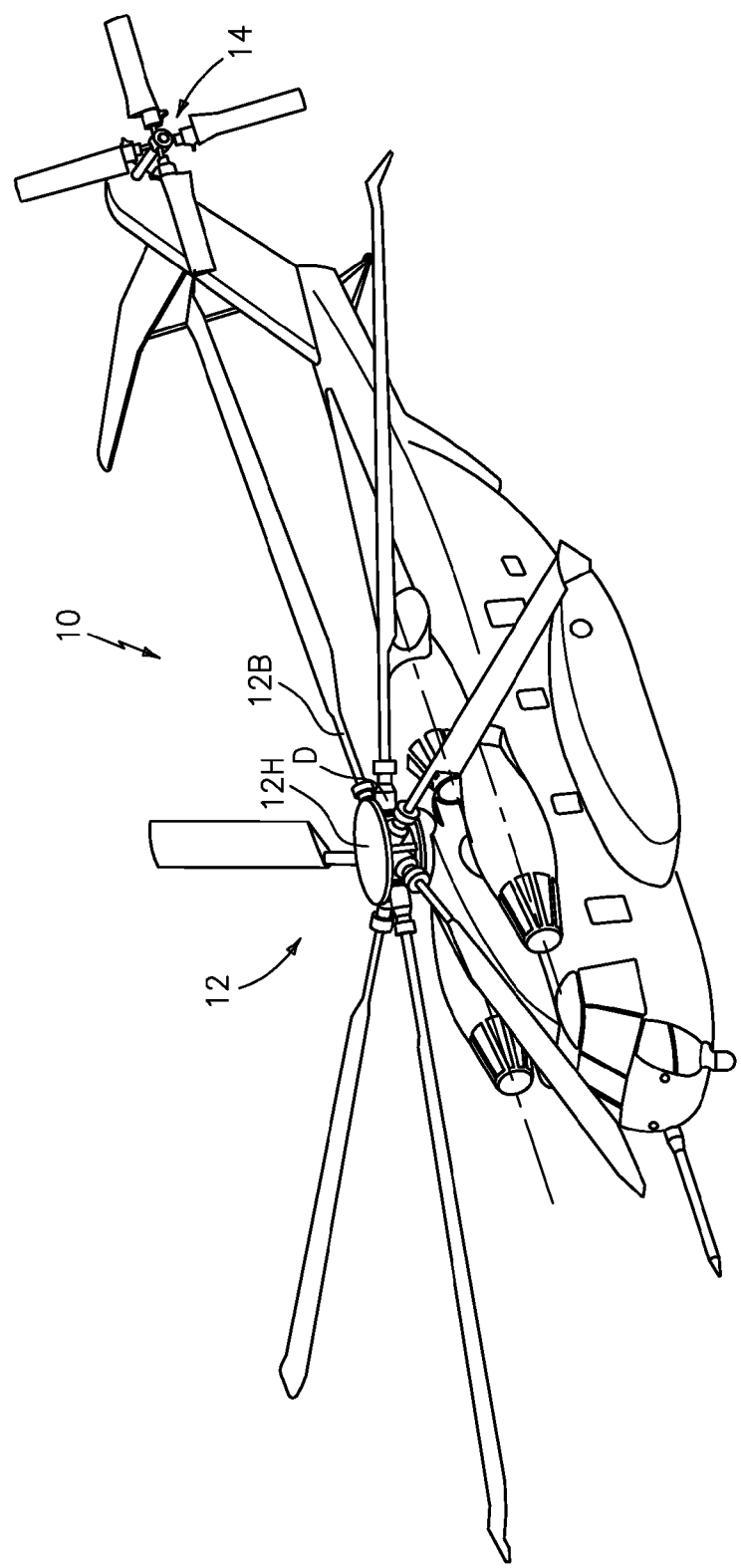
FIG. 1 is a general perspective view an exemplary rotary wing aircraft embodiment for use with the present invention.

FIG. 1 illustrates a general perspective view of a helicopter embodiment 10 of a rotary wing aircraft for use with the present invention. The helicopter includes a main rotor assembly 12 and tail rotor assembly 14. A mechanical lead/lag damper D (illustrated schematically) is mounted between a rotor hub 12H and each rotor blade assembly 12B to react in-plane edgewise motion of each blade assembly 12B to dampen vibration. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
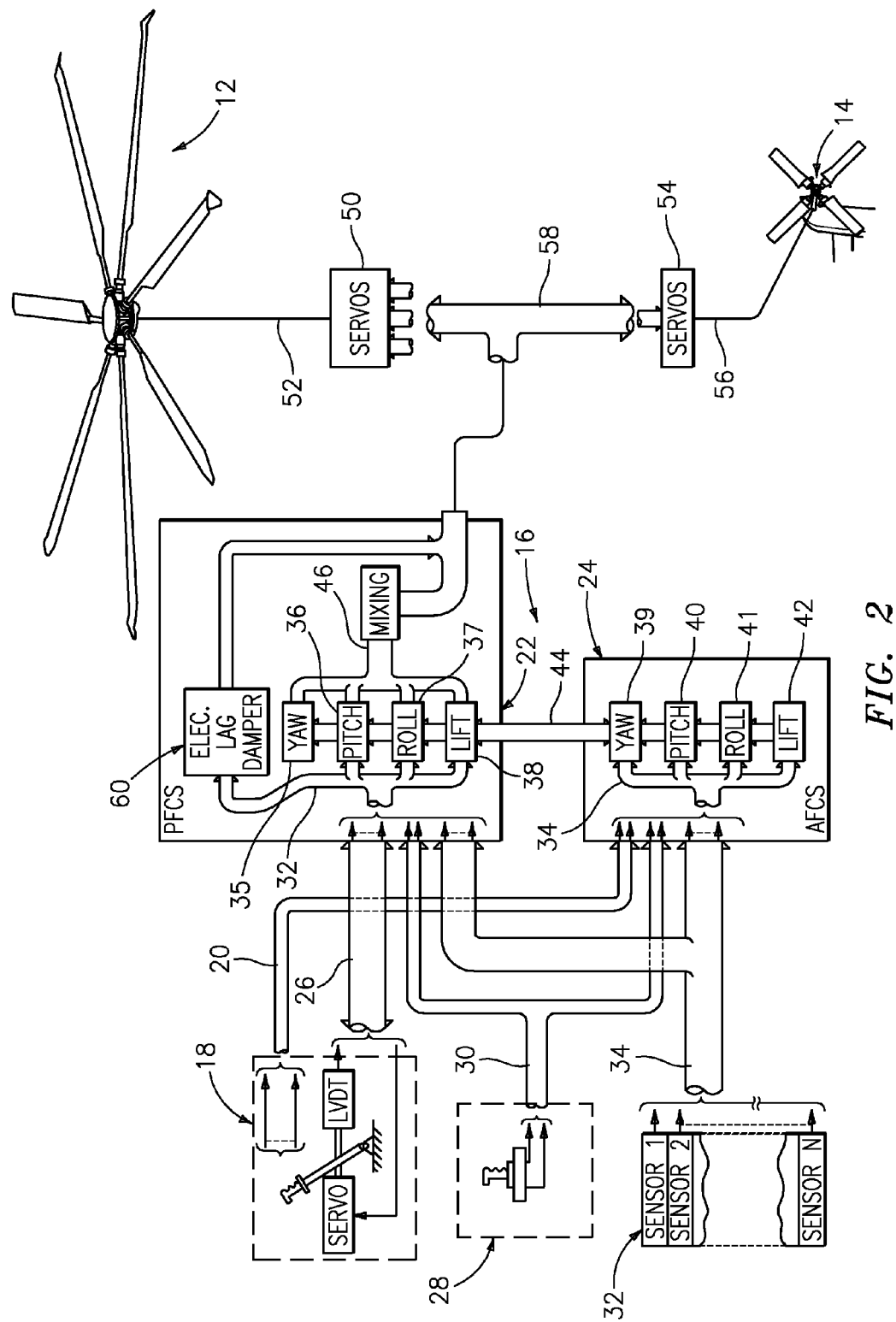
FIG. 2 is a schematic diagram of a model following flight control system.

Referring to FIG. 2, a fly-by-wire type flight control system 16 includes a model following control system which shapes the pilot's controller and displacement commands through an inverse vehicle model to produce the desired aircraft response. The system includes a Primary Flight Control System (PFCS) 22 and an Automatic Flight Control System (AFCS) 24.

The PFCS 22 is the flight critical portion of the flight control system, while the AFCS 24 is the mission critical portion. The AFCS augments the performance of the PFCS to meet the stringent handling qualities requirements of ADS-33C and provide Level 1 handling qualities over a wide range of flight conditions. The PFCS and AFCS execute explicit model following control laws to provide both control and stability augmentation. In this control law architecture, pilot commands are shaped directly into desired aircraft responses. These desired commands are then passed through an inverse aircraft model to obtain the control commands needed to produce the desired response. The difference between the desired command and the aircraft response is also fed back to drive these errors towards zero, thus improving the model following performance.

The PFCS 22 and AFCS 24 each receive the force output command signals of a collective controller 18 on line 20, a cyclic controller 28 on lines 30, and the aircraft's sensed parameter signals from sensors 32, on lines 34. The collective control 18 and the cyclic control 28 may take various forms including sidearm controllers or other such control controllers. The pilot command signals on lines 20, 26, 30 and the sensed parameter signals on lines 34 are shown consolidated within trunk lines 32 and 34 in the PFCS and FACS, respectively.

The PFCS 22 and AFCS 24 may each contain separate control channel logic laws for controlling the yaw, pitch, roll and lift axes of the aircraft. The logic is included in the PFCS and FACS control modules (schematically represented by blocks 35-38 for the PFCS and blocks 39-42 for the AFCS). The sensed parameter signals from aircraft sensors 32, on lines 34, provide the PFCS and AFCS with the aircraft's angular rate and attitude response to the rotor command signals. The PFCS logic provides rotor command signals and the AFCS logic provides conditioning and/or trimming of the PFCS four axis logic functions. The PFCS and AFCS logic modules interconnect through bus 44 to provide rotor command signals on output lines 46 to a mixing function 48 which communicates commands on lines 58 for the displacement of servos 50 and linkages 52 to control the tip path plane of the main rotor 12. A mixed command signal is also provided on line 58 to the helicopter's tail rotor servos 54 which control the thrust of the tail rotor 14 through linkages 56.

Figure 3:
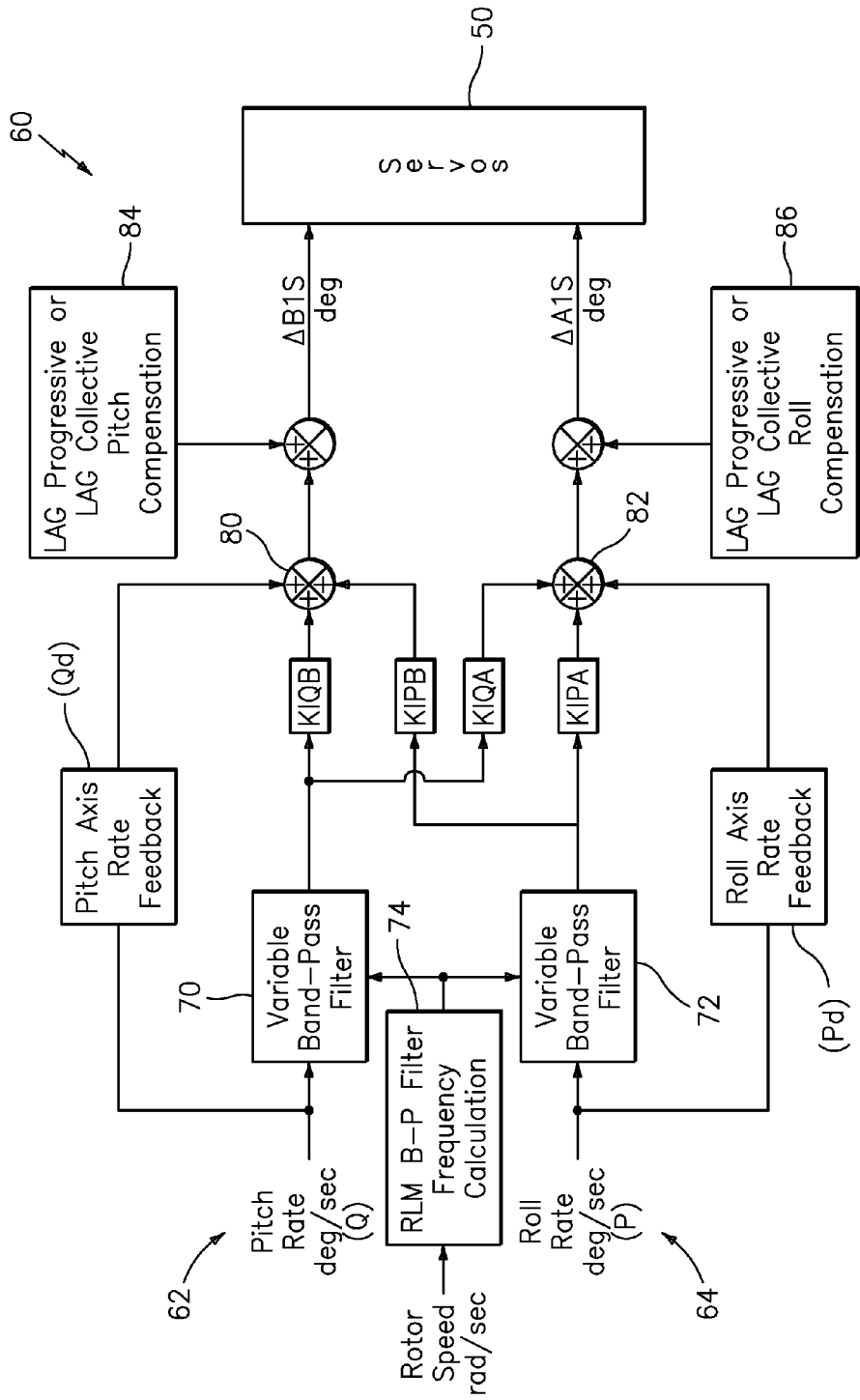
FIG. 3 is a block diagram of a electronic lead/lag damper algorithm.

Referring to FIG. 3, an electronic lead/lag damper algorithm 60 is schematically illustrated in a block diagram format. The flight control system 16 utilizes a model-following architecture to implement the electronic lead/lag damping algorithm 60. The electronic lead/lag damping algorithm 60 may be microprocessor based with a central processing unit, memory (RAM and/or ROM), with associated input and output buses, and/or may be a portion of a central vehicle main control system, an interactive vehicle dynamics module, or stand-alone controllers. Control law algorithms are the scheme by which the decisions are made.

The electronic lead/lag damper algorithm 60 receives cyclic input and a rotor speed input. The cyclic input includes a measured pitch rate in degrees/sec (Q) 62 and a measured roll rate in degrees/sec (P) 64. Pitch rate (Q) and roll rate (P) as well as the rotor speed are readily provided as standard signals within the fly-by-wire flight control system 16 and/or as sensed by the sensor system 32 which directly measures aircraft dynamics. The output from the electronic lead/lag damper algorithm 60 is a swashplate movement servo command in pitch ($\Delta B1S$) and roll ($\Delta A1S$) to control the swashplate and thus the aircraft.

The electronic lead/lag damper algorithm 60 is applied only in a certain limited frequency range which is the same frequency range where the rotor blade lead/lag characteristic occurs since the rotor blade lead/lag (fore/aft) motion occurs only at a particular frequency range. This is in addition to the pitch axis rate feedback direct path (Qd) from pitch rate to pitch axis swashplate movement servo command in pitch ($\Delta B1S$) and the roll axis rate feedback direct path (Pd) from roll rate to roll axis input swashplate movement servo command in roll ($\Delta A1S$).

The electronic lead/lag damper algorithm 60 is applied within this frequency range and through a pitch rate variable band pass filter 70 and a roll rate variable band pass filter 72 which are varied in response to the rotor speed and band pass filter frequency calculation logic 74. That is, as rotor speed changes, the filter frequency changes so that the variable band pass filters 70, 72 remain coincident—not necessarily at the same frequency but affected thereby; typically a scaled frequency—of that rotor speed frequency. In other words, Rotor speed is tracked and the variable band pass filters 70, 72 are varied in response thereto.

Downstream of the pitch rate variable band pass filter 70 on the direct pitch rate path (K1QB), pitch rate (Q) is measured then multiplied by a gain K1 and limited to obtain $\Delta B1S$. Downstream of the roll rate variable band pass filter 72 on the direct roll rate path (K1PA), roll rate (P) is measured then multiplied by a gain K1 and limited to obtain $\Delta B1S$.

K1 is a gain. B corresponds to the BIS path and A corresponds to the A1S path. So K1QB is a gain placed on the path which communicates the filtered pitch rate Q to summing junction 80. So that is a direct filtered pitch rate path. Similarly, K1PA is a gain placed on the direct path which communicates the filtered roll rate P to summing junction 82. This is another direct feed path.

The present invention provides a cross-feed (Q pitch rate and P roll rate) from one direct path to the other direct path at the respective summing junction 80, 82. That is, the electronic lead/lag damper algorithm uses a cross-feed control methodology that band-pass filters pitch and roll rates then feeds back a signal to the lateral and longitudinal cyclic inputs to add electronic stability to rotor lag modes.

K1QA is a cross-feed path from the pitch rate Q direct path to the roll rate direct path K1PA. K1PB is a cross-feed path from the roll rate P direct path to the pitch rate direct path K1QB. The cross-feed is essentially a phase shifting of the pitch and roll rate feedback. So there are two filtered on-axis direct paths which feed the respective axis and two cross-feed paths which feed from one axis to the other axis.

In other words, to reduce the mechanical lead/lag damper D size, pitch and roll rate are measured, the variable band pass filter rate is set to the frequency range of interest in response to rotor speed, then the direct paths are cross-fed (K1PB, K1QA) to the other axes (K1QB, K1PA) to obtain the swashplate movement servo command in pitch ($\Delta B1S$) and roll ($\Delta A1S$) to control the swashplate and thus the aircraft.

In operation, the mechanical lead/lag damper D is sized to the expected lead/lag motion to reduce the lead/lag motion to a desired limit. Through operation of Coriolis force, when the rotor blade, for example, flaps-up, the effective CG of the rotor blade moves closer to the rotor system axis of rotation. That is; there is a tradeoff between rotational motion and translational motion such that flapping results in movement in the fore (lead) or aft (lag) edgewise direction. Due to the large blade area in the out of plane flapping motion, the flapping motion is an aerodynamically well damped motion while the lead/lag motion is essentially aerodynamically un-damped as the lead/lag motion is edgewise motion. The mechanical damper essentially produces a counter edgewise force which resists the rotor blade lead/lag motion. The electronic lead/lag damper algorithm 60, however; through the cross feed paths—reduces blade flap to reduce blade lead/lag because blade lead/lag is a byproduct of rotor blade flapping. That is, through control of the blade flap and the inherent damping in the flapping direction, blade lead/lag and thus requirements for the mechanical lead/lag damper are reduced.

Figure 4:
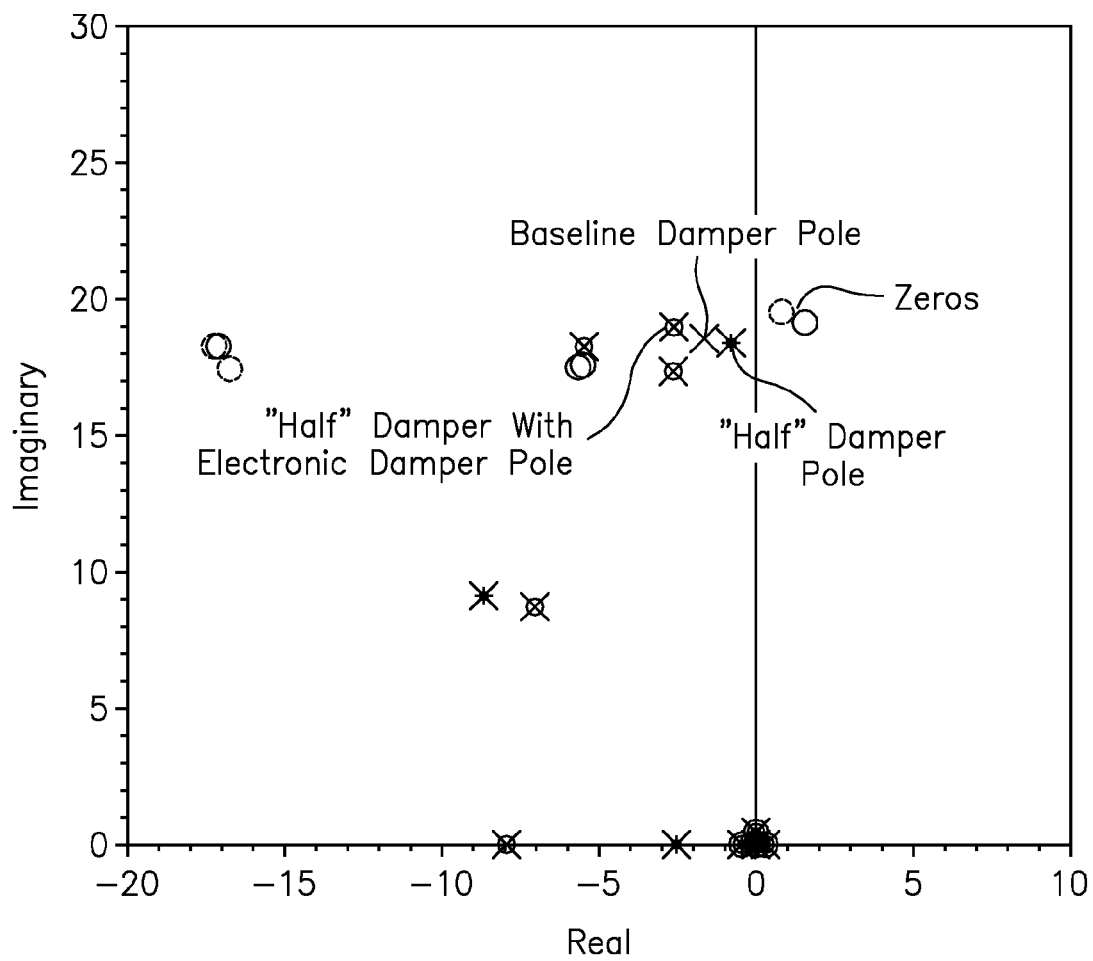
FIG. 4 is a poles and zeros graphical representation of the effects of the electronic damper on lag regressive mode stability at 100% rotor speed.

Referring to FIG. 4, the effects of the electronic lead/lag damper algorithm 60 on regressive lag mode (RLM) stability at 100% rotor speed is illustrated in pole-zero graph. The figure shows the poles and zeros of system aircraft control system combination. The circles represent different frequency levels, while the radial lines denote damping levels. A pole position on a radial line more to the left indicates more damping. For the aircraft model used here, the mode of interest which is the regressive lag mode (RLM) has a frequency of approximately 18 rad/sec.

In bold are the baseline poles and zeros. As the figure shows, the baseline pole is along the radial line marked as having a damping level of about 0.1. The aircraft lag damper characteristics are then modified to reduce the physical damping to half the baseline amount. This is done to simulate a smaller lag damper. The half damper pole is shown in a dashed format. The zero for this case overlays the baseline damper zero. As shown by the closed-loop poles of the system, the RLM frequency is very lightly damped with baseline mechanical lead/lag dampers such that the modal damping decreases when the "half" dampers are substituted. That is, the damping of the half-damper poles is approximately half of the baseline, or along the 0.05 damping line, as expected.

Shown in normal are the poles and zeros with the electronic lag damper implemented to augment the damping of the small damper that provides half as much damping as the baseline case. As illustrated from the pole position along the 0.15 damping line, the addition of the electronic lag damper according to the present invention improves the damping of the RLM pole from 0.05 to 0.15, taking it to a level beyond the 0.1 level of the baseline damper. That is, when the electronic lead/lag damper algorithm 60 is applied to the fly-by-wire flight control system, the RLM damping is even higher than the baseline. Similar results occur for different modal frequencies.

Although the system in the disclosed embodiment illustrates a half-size mechanical damper with the remainder compensation obtained by the electronic lead/lag damper algorithm 60, it should be understood that the compensation provided by the electronic lead/lag damper algorithm 60 may be utilized to completely eliminate or reduce the mechanical damper size to any desired value.

It should be understood that although the disclosed embodiment is discussed in terms of an implementation for augmenting damping for the regressive lag mode (RLM), the approach of the present invention is also applicable to lag modes such as collective or progressive lag modes merely by appropriately changing the band pass frequency calculation, 74. The output of such a implementation for the collective or progressive lag modes for the pitch axis 84 and for the roll axis 86 as well as other conventional compensation inputs may also be summed at the summing junctions 80, 82.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotary-wing aircraft comprising:
    a rotor hub having at least one rotor blade assembly;
    a lead/lag damper mounted to said rotor hub and said at least one rotor blade assembly, said lead/lag damper provides a first damping value, said first damping value less than a required damping value of said at least one rotor blade assembly; and
    a fly-by-wire flight control system having an electronic lead/lag damper algorithm which provides a damping value which defines at least the difference between said first damping value and said required damping value.

2. The aircraft as recited in claim 1, wherein said rotor hub includes a main rotor hub.

3. The aircraft as recited in claim 2, wherein said main rotor hub forms a part of an articulated rotor system of a rotary wing aircraft.

4. The aircraft as recited in claim 1, wherein said fly-by-wire type flight control system includes a model following control system.

5. The aircraft as recited in claim 1, wherein said electronic lead/lag damper algorithm provides a cross-feed control methodology that band-pass filters a pitch rate and a roll rate then feeds back these filtered signals to both a lateral cyclic input and a longitudinal cyclic input to said fly-by-wire type flight control system.

6. The aircraft as recited in claim 5, wherein said cross-feed control methodology band-pass filters said pitch rate and said roll rate in response to a rotor speed.

7. A fly-by-wire flight control system comprising:
    a memory storing instructions operable to cause said fly-by-wire flight control system to perform an electronic lead/lag damper method with a cross-feed control methodology that band-pass filters a pitch rate and a roll rate then feeds back the respective signals to a lateral cyclic input and a longitudinal cyclic input of said fly-by-wire type flight control system.

8. The system as recited in claim 7, wherein said cross-feed control methodology is filtered in response to a calculated frequency.

9. The system as recited in claim 8, wherein said cross-feed control methodology band-pass filters said pitch rate and said roll rate in response to a rotor speed.

10. A fly-by-wire flight control system implemented method of lead/lag damping for a rotary-wing aircraft rotor system comprising the steps of:
    (A) band pass filtering a pitch rate and a roll rate;
    (B) cross-feeding the pitch rate and the roll rate from said step (A);
    (C) feeding back the cross-feed signals from said step (B) to a lateral cyclic input and a longitudinal cyclic input of a fly-by-wire type flight control system.

11. A method as recited in claim 10, wherein said step (A) further comprises:
    (a) varying the band-pass filter in response to rotor speed.

12. A method as recited in claim 10, wherein said step (A) further comprises:
    (b) varying the band-pass filter center frequency in response to a calculated frequency.

13. A method as recited in claim 10, further comprising the steps of:
    (D) directly feeding a pitch rate and a roll rate to the lateral cyclic input and the longitudinal cyclic input of the fly-by-wire type flight control system.

14. The aircraft as recited in claim 1, wherein said lead/lag damper reacts in-plane edgewise motion of said at least one rotor blade assembly to dampen vibration.

15. The system as recited in claim 7, wherein said electronic lead/lag damper method supplements a lead/lag damper mounted to a rotor hub and at least one rotor blade assembly, the lead/lag damper provides a first damping value less than a required damping value of said at least one rotor blade assembly.

16. The system as recited in claim 15, wherein said electronic lead/lag damper method provides a damping value which defines at least the difference between the first damping value and a required damping value.

17. The system as recited in claim 16, wherein feeding back the cross-feed signals from said step (B) to the lateral cyclic input and the longitudinal cyclic input of the fly-by-wire type flight control system supplements a lead/lag damper mounted to a rotor hub and at least one rotor blade assembly, the lead/lag damper provides a first damping value less than a required damping value of the at least one rotor blade assembly.

18. The system as recited in claim 16, wherein feeding back the cross-feed signals from said step (B) provides a damping value which defines at least the difference between the first damping value and a required damping value.

* * * * *